Nov. 17, 1936.  J. H. INGMANSON  2,061,276
TREATMENT OF RUBBER
Filed March 31, 1933
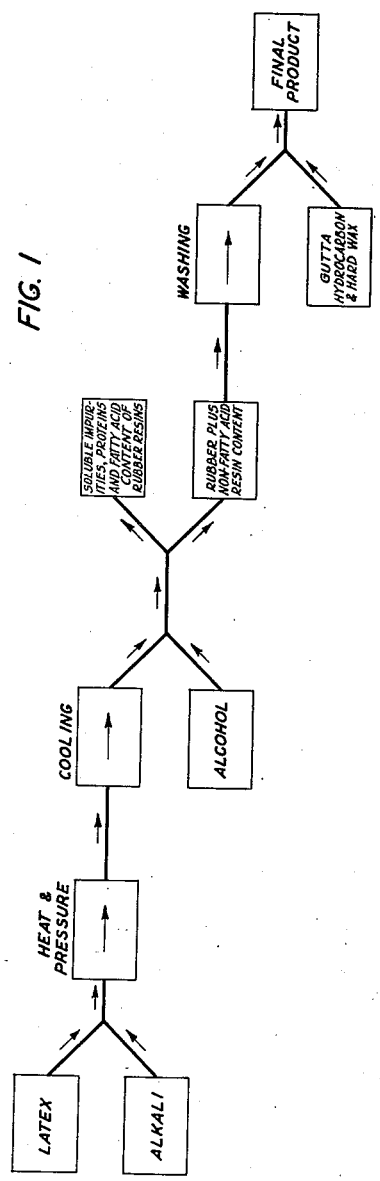
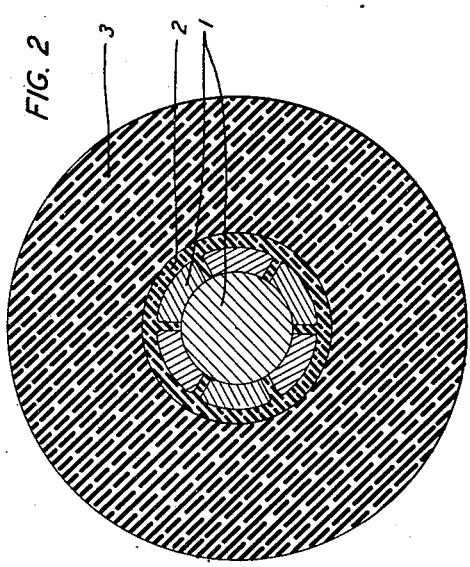
INVENTOR
J. H. INGMANSON
BY
J. W. Schmied
ATTORNEY Patented Nov. 17, 1936

2,061,276

UNITED STATES PATENT OFFICE 2,061,276

TREATMENT OF RUBBER

John H. Ingmanson, Rahway, N. J., assignor to Bell Telephone Laboratories, Incorporated, New York, N. Y., a corporation of New York Application March 31, 1933, Serial No. 663,727

6 Claims. (Cl. 18—50)

This invention relates to improvements in methods of treating rubber designed for use wherever the rubber is likely to come into contact with or in close proximity to copper, copper containing alloys, or other metals likely to react with the rubber in the manner hereinafter set forth. A particular field to which the invention relates is that of rubber or rubber containing insulation for unloaded under-water electrical conductors; the scope of the invention is not limited to such uses.

A recent development in cable manufacture has been the employment of insulating compositions containing highly purified and largely deproteinized rubber mixed with a portion of balata, gutta percha and wax or similar substances. The present invention relates particularly to such insulating materials or other equivalent materials containing rubber. Methods of producing and utilizing such insulating compositions are described in U. S. patent in name of A. R. Kemp, No. 1,829,992, granted November 3, 1931 and also in British Patent 354,380, filed May 9, 1930, as well as in other patents and publications. Such insulating materials have been employed upon cables and from observations to date have been found to function in a satisfactory manner. Nevertheless upon preparing and applying such compositions to conductors, and more particularly to unloaded copper conductors, and observing their properties when kept under water in storage tanks over a period of time, there was occasionally noted a green coloration of the insulating material and sometimes the formation of a soft or pasty layer next to the conductor. The coloration and the softening of the insulation decreased in intensity through the insulation as the distance from the conductor increased. As a maximum this green coloration extended for a distance of about $\frac{1}{32}$ inch (0.8 mm.) It would occur in some cases only after six months or a year. The same tendency was observed in cable cores kept either in tanks of salt water or in air. The presence of a thick layer of semi-plastic depolymerized rubber between the conductor and the insulation showed some tendency to decreased formation of the characteristic "green substance" but the evidence in this respect was indeterminate. The addition of various well known anti-oxidants to the insulating material appeared to have no effect.

Observation of the phenomena connected with the formation of "green substance" led to the preliminary conclusion that they were due to the presence of soluble acetates remaining in the rubber after coagulation with acetic acid and washing. An investigation was made and the ultimate conclusion reached that the acetates were not the cause of the phenomena observed.

Further investigation led to the conclusion that the difficulty arose from the presence in the rubber and their interaction with the copper of that portion of the naturally occurring resins which consists of fatty acids. These fatty acids occur more particularly in Hevea rubber which is the variety most commonly employed in the production of rubber insulation.

Consequently, in accordance with this invention, deproteinized rubber in one case and deproteinized and depolymerized rubber in another case are prepared by a method which results in the removal from the rubber of at least a very large portion of the fatty acid constituents of the rubber resins, leaving in the rubber the other resin constituents which are believed to be very desirable therein from the standpoint of improving the aging characteristics of rubber or rubber containing compositions in which it is included.

As an example of a method according to this invention rubber latex is prepared by heating a given quantity thereof, for example, by mixing 100 liters of latex with 10 liters of 10% solution of sodium hydroxide and heating the mixture in an autoclave at 150° C. for two hours, then cooling to room temperature and coagulating the rubber by the slow addition of 25 liters of 95% ethyl alcohol or an equal amount of acetone. After the coagulation of the rubber the washing and compounding processes are similar to those previously described and known in the literature of the art, for example, in the patents above mentioned.

By coagulating the rubber from the alkaline latex solution with non-acid substances such as alcohol or acetone, it appears that the fatty acids which are then present as water soluble alkali salt in the rubber mass and the supernatant liquid are not rendered insoluble and precipitated but may be eliminated during the washing operations. This is quite contrary to the results following the customary coagulation with acetic acid due to which these sodium salts are reconverted to fatty acids which are not freely soluble in water but are precipitated mixed with the coagulated rubber. Chemical comparisons of the serums remaining after coagulation of the rubber with alcohol or acetone and the serums from rubber coagulated by acid processes prove the correctness of these statements.

There is evidence also that the electrical properties of insulating compositions prepared from rubber treated in accordance with the present invention are slightly superior to those compositions prepared from rubber manufactured in accordance with previous methods. Such compositions may be prepared and applied to cable conductors in accordance with known methods.

The properties of such compositions may be illustrated by examples.

*Example 1.*—A composition was prepared consisting of 50% deresinated balata, 40% deproteinized rubber coagulated with alcohol and 10% of a wax of the paraffin series of high melting point commonly known as "superla" wax. This composition had properties as follows:

| | |
|---|---|
| Tensile strength | 2025 lbs. per square inch |
| Elongation | 510 per cent |
| Specific inductance capacity (K) | 2.55 to 2.60 |
| Specific conductance | 1.34 to $1.77 \times 10^{-12}$ mho cm.$^3$ |
| Specific resistivity | $7 \times 10^{15}$ ohm cm.$^3$ |
| G/C | 5.8 to 7.8 (1000 cycles) |
| Nitrogen content of the rubber | 0.06 per cent |
| Resin content of the rubber | 1.3 per cent |

*Example 2.*—Consisted of the same ingredients except that the deproteinized rubber was coagulated with acetone. Its properties were as follows:

| | |
|---|---|
| Tensile strength | 2260 lbs. per square inch |
| Elongation | 540 per cent |
| Specific inductive capacity (K) | 2.52 to 2.62 |
| Specific conductance | $1.29 \times 10^{-12}$ mhos cm.$^3$ |
| Specific resistivity | $7 \times 10^{15}$ ohm cm.$^3$ |
| G/C | 5.7 (1000 cycles) |
| Nitrogen content of the rubber | 0.06 per cent |
| Resin content of the rubber | 1.3 per cent |

The quantity of alcohol or acetone necessary to coagulate the rubber increases with dilution of the latex. Consequently the amount needed may be reduced by deproteinizing the latex in as concentrated a form as is convenient. The alcohol or acetone may be largely recovered by distillation of the serum. Alcohol and acetone are examples of non-acid chemicals which are coagulants of rubber due to the fact that they have little tendency to dissolve rubber. It is within the scope of the invention to employ other organic substances including other alcohols or ketones as may have similar properties. Practical considerations and the known properties of alcohols and ketones limit their use to alcohols and ketones of the simpler types containing, in general, not over five carbon atoms. Such limitation will be understood in what follows. Substances which are solvents of rubber are obviously excluded.

With respect to an ordinary depolymerized rubber layer between the main insulation and the copper conductor one may conclude that it does not completely prevent formation of green substance for the same reason that the insulation itself does not, namely, that it contains fatty acids.

The formation of green substance is preventable in the prior art by tinning the copper conductor, by the use of heavy layers of Chatterton's compound and/or by the use of layers of asphalt flux. Any necessity for use of these safeguards may be avoided by the application of the principles of the present invention. The use of depolymerized rubber as a pressure equalizing and/or filling material offers electrical advantages, and it is within the scope of the invention to prepare the rubber prior to depolymerization in accordance with the methods herein outlined. However, in preparing depolymerized rubber for use as pressure equalizing material there is not the same advantage of retaining the non-fatty acid constituents of the rubber and the rubber may be prepared in accordance with a method which substantially entirely deresinates it after which it is depolymerized in accordance with the methods usually employed.

In the accompanying drawing:

Fig. 1 is a process diagram of the steps of manufacturing insulation in accordance with the invention; and Fig. 2 is a view of a submarine cable core insulated therewith.

In Fig. 2 the conductor 2 consists of a compound copper conductor 1 of the usual type filled with deproteinized and depolymerized impregnating material 2 and insulated with a principal insulation 3 prepared according to the method described herein.

What is claimed is:

1. A method of preparing rubber which consists in treating latex in alkali solution at temperatures around 150° C. for a few hours, coagulating the rubber by the addition of a sufficient amount of non-acid rubber coagulating material of the general nature of alcohol, separating and washing the rubber.

2. A process of preparing rubber substantially free of fatty acid constituents which comprises converting the fatty acid constituents in said rubber to alkaline salts and treating the alkaline salts of said fatty acid constituents and said rubber with a member of a group consisting of alcohol and ketone to separate said fatty acid constituents from said rubber.

3. A process of preparing rubber substantially free of fatty acid constituents which comprises converting the fatty acid constituents of said rubber into alkaline salts and treating the alkaline salts of said fatty acid constituents and said rubber with an alcohol to separate said fatty acid constituents from said rubber.

4. A process of preparing rubber substantially free of fatty acid constituents which comprises converting the fatty acid constituents of said rubber into alkaline salts and treating the alkaline salts of said fatty acid constituents and said rubber with a ketone to separate said fatty acid constituents from said rubber.

5. A process of preparing rubber comprising deproteinizing rubber by treatment thereof in alkaline dispersion at temperatures above the boiling point, coagulating the rubber therefrom by ethyl alcohol and washing the rubber.

6. A process of preparing rubber comprising deproteinizing rubber by treatment thereof in alkaline dispersion at temperatures above the boiling point, coagulating the rubber therefrom by acetone and washing the rubber.

JOHN H. INGMANSON.